US012466934B2

(12) United States Patent
Liao et al.

(10) Patent No.: US 12,466,934 B2
(45) Date of Patent: *Nov. 11, 2025

(54) METHOD FOR RECYCLING POLYESTER FABRICS WITH USE OF IONIC LIQUID CATALYST

(71) Applicant: NAN YA PLASTICS CORPORATION, Taipei (TW)

(72) Inventors: Te-Chao Liao, Taipei (TW); Jung-Jen Chuang, Taipei (TW); Wei-Sheng Cheng, Taipei (TW); Zhang-Jian Huang, Taipei (TW); Yu-Ti Tseng, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 724 days.

This patent is subject to a terminal disclaimer.

(21) Appl. No.: 17/849,691

(22) Filed: Jun. 26, 2022

(65) Prior Publication Data

US 2023/0062055 A1 Mar. 2, 2023

(30) Foreign Application Priority Data

Aug. 26, 2021 (TW) .................... 110131554

(51) Int. Cl.
| | |
|---|---|
| *C08J 11/28* | (2006.01) |
| *B01D 15/16* | (2006.01) |
| *B01D 15/36* | (2006.01) |
| *B01D 17/02* | (2006.01) |
| *B01J 31/02* | (2006.01) |
| *B09B 3/70* | (2022.01) |
| *B29B 17/00* | (2006.01) |
| *B09B 101/75* | (2022.01) |
| *B09B 101/85* | (2022.01) |
| *B29K 67/00* | (2006.01) |

(52) U.S. Cl.
CPC ............ *C08J 11/28* (2013.01); *B01D 15/161* (2013.01); *B01D 15/361* (2013.01); *B01D 17/0208* (2013.01); *B01J 31/0284* (2013.01); *B01J 31/0295* (2013.01); *B09B 3/70* (2022.01); *B29B 17/00* (2013.01); *B09B 2101/75* (2022.01); *B09B 2101/85* (2022.01); *B29K 2067/003* (2013.01); *C08J 2367/02* (2013.01)

(58) Field of Classification Search
CPC .... C08J 11/24; C08J 2367/02; B01J 31/0292; B01J 31/0295
See application file for complete search history.

(56) References Cited

U.S. PATENT DOCUMENTS

| | | | |
|---|---|---|---|
| 5,504,121 A | 4/1996 | West | |
| 9,255,194 B2 | 2/2016 | Allen et al. | |
| 2002/0169071 A1 | 11/2002 | Sauvage et al. | |
| 2016/0107981 A1* | 4/2016 | Vilaplana Artigas | B01J 35/33 560/60 |
| 2017/0369670 A1* | 12/2017 | Van Berkum | C08J 11/04 |
| 2018/0037710 A1* | 2/2018 | Hooghoudt | C08J 11/28 |
| 2018/0371206 A1 | 12/2018 | Castillo et al. | |

FOREIGN PATENT DOCUMENTS

| | | |
|---|---|---|
| CN | 100344604 C | 10/2007 |
| CN | 102731310 A | 10/2012 |
| CN | 104447341 A | 3/2015 |
| CN | 107406618 A | 11/2017 |
| CN | 108212210 A | 6/2018 |
| CN | 112851502 A | 5/2021 |
| JP | 8502079 A | 3/1996 |
| JP | 200053802 A | 2/2000 |
| JP | 2003512926 A | 4/2003 |
| JP | 200888096 A | 4/2008 |
| JP | 2018502977 A | 2/2018 |
| JP | 2019505373 A | 2/2019 |

OTHER PUBLICATIONS

East, A. J. Polyesters, Thermoplastic. Kirk-Othmer Encyclopedia of Chemical Technology. John Wiley & Sons, Inc. Mar. 24, 2006. (Year: 2006).*
Yamamura et al. Preparation and characterization of (3-aminopropyl) triethoxysilane-coated magnetite nanoparticles. Journal of Magnetism and Magnetic Materials, 2004, 279, 210-217. (Year: 2004).*
Wang et al. Glycolysis of polyethylene terephthalate: Magnetic nanoparticle CoFe2O4 catalyst modified using ionic liquid as surfactant. European Polymer Journal, 2021, 155, 110590. (Year: 2021).*
Al-Sabagh et al. Ionic Liquid-Coordinated Ferrous Acetate Complex Immobilized on Bentonite As a Novel Separable Catalyst for PET Glycolysis. Ind. Eng. Chem. Res. 2015, 54, 12474-12481. (Year: 2015).*
Haidong Cheng, Shuangjun Chen, Degradation and Synthesis of Poly ( Ethylene Terephthalate ) by Functionalized Ionic Liquids, Progress in Chemistry, Apr. 24, 2017, p. 443-449, College of Materials Science and Engineering, Nanjing Tech University, Nanjin China.

\* cited by examiner

*Primary Examiner* — Stephen E Rieth

(74) *Attorney, Agent, or Firm* — Li & Cai Intellectual Property Office

(57) ABSTRACT

A method for recycling polyester fabrics with use of an ionic liquid catalyst is provided, which includes: providing a recycled polyester fabric; and using a chemical de-polymerization liquid to chemically de-polymerize the recycled polyester fabric and form a de-polymerization product that includes bis-2-hydroxylethyl terephthalate (BHET). The chemical de-polymerization liquid is used to chemically de-polymerize the recycled polyester fabric in an environment where a de-polymerization catalyst exists, and the de-polymerization catalyst is the ionic liquid catalyst in a solid state.

8 Claims, 1 Drawing Sheet

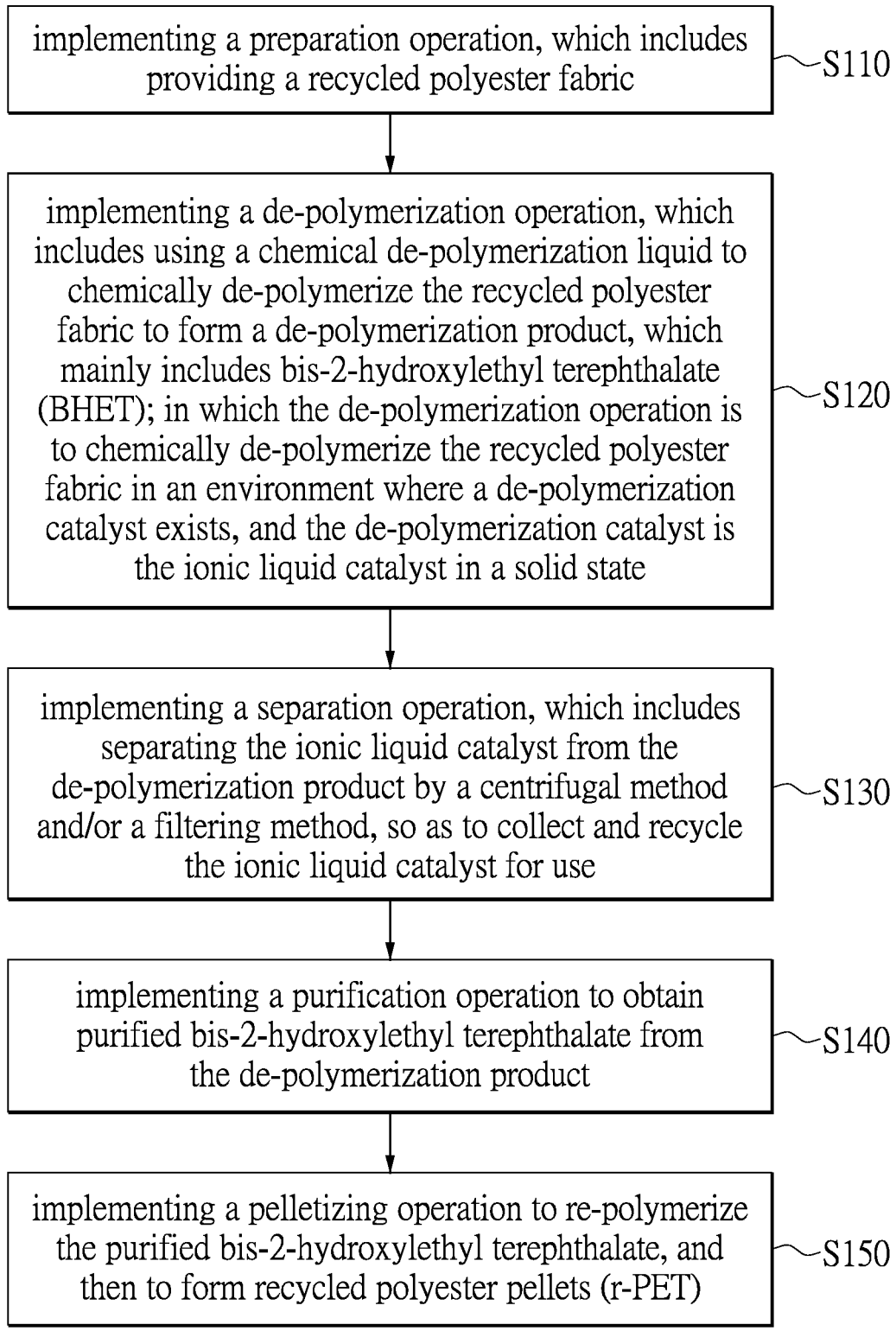

METHOD FOR RECYCLING POLYESTER FABRICS WITH USE OF IONIC LIQUID CATALYST

CROSS-REFERENCE TO RELATED PATENT APPLICATION

This application claims the benefit of priority to Taiwan Patent Application No. 110131554, filed on Aug. 26, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for recycling polyester fabrics, and more particularly to a method for recycling polyester fabrics with use of an ionic liquid catalyst.

BACKGROUND OF THE DISCLOSURE

In the related art, a conventional chemical recycling method of polyester fabrics (PET fabric) is to chemically de-polymerize the polyester fabrics with a chemical de-polymerization liquid (such as ethylene glycol), so as to form a de-polymerization product. The de-polymerization product mainly includes bis(2-hydroxyethyl) terephthalate (BHET). However, the conventional chemical recycling method requires a complicated purification process to remove dyes and other impurities originally present in the polyester fabrics, so that the BHET can be re-polymerized to form high-quality recycled polyester pellets (r-PET).

In the above-mentioned chemical recycling method of polyester fabrics, one conventional chemical de-polymerization method is an alcoholysis technique, and the alcoholysis technique usually uses organic metals (e.g., zinc acetate, organic titanium metal, or organic antimony metal) as catalysts. However, the process of using organic metal catalysts to catalyze a de-polymerization reaction for forming the BHET has disadvantages such as occurrences of many side reactions and difficulty in recovering the catalyst. Therefore, producing the r-PET with use of the BHET that is formed in this manner has disadvantages including poor quality and high recycling costs. Although using a nano-grade catalyst has good de-polymerization characteristics, recovering the catalyst by solid-liquid separation (e.g., sedimentation or filtration) is not easy, thereby causing difficulties in mass production.

U.S. Pat. No. 9,255,194 (B2) proposes a method for de-polymerization of polyester fabrics. The method proposed in this patent uses an organic substance with a low boiling point as a catalyst, which can be recovered by evaporation. Compared with the conventional organic metal catalyst, this method has an advantage that the catalyst can be recycled. However, the purity of the BHET formed by this method is still low. Therefore, the recycled polyester pellets (r-PET) formed by this method still have a quality poorer than that of virgin polyester pellets, and this method also has the disadvantage of high recycling costs.

Patent No. CN 100344604 (C) proposes a method for de-polymerization of polyester fabrics. The method proposed in this patent chemically de-polymerizes the polyester fabrics. However, this method uses the organic metal catalysts to catalyze the de-polymerization reaction for forming the BHET, which has the disadvantages such as occurrences of many side reactions and difficulty in recovering the catalyst. Therefore, the recycled polyester pellets (r-PET) produced by the BHET formed in this manner also has the disadvantages of having poor quality and high recycling costs.

SUMMARY OF THE DISCLOSURE

In response to the above-referenced technical inadequacies, the present disclosure provides a method for recycling polyester fabrics with use of an ionic liquid catalyst.

In one aspect, the present disclosure provides a method for recycling polyester fabrics with use of an ionic liquid catalyst. The method includes: implementing a preparation operation, which includes providing a recycled polyester fabric; implementing a de-polymerization operation, which includes using a chemical de-polymerization liquid to chemically de-polymerize the recycled polyester fabric to form a de-polymerization product, in which the de-polymerization product mainly includes bis-2-hydroxylethyl terephthalate (BHET), the de-polymerization operation is to chemically de-polymerize the recycled polyester fabric in an environment where a de-polymerization catalyst exists, and the de-polymerization catalyst is the ionic liquid catalyst in a solid state; and implementing a separation operation, which includes separating the ionic liquid catalyst from the de-polymerization product by a centrifugal method and/or a filtering method, so as to collect and recycle the ionic liquid catalyst for use.

In certain embodiments, in the de-polymerization operation, the chemical de-polymerization liquid is ethylene glycol (EG), and the chemical de-polymerization liquid is heated to a de-polymerization temperature between 180° C. and 260° C. to chemically de-polymerize the recycled polyester fabric.

In certain embodiments, in the de-polymerization operation, the ionic liquid catalyst includes a substrate and ionic liquids grafted on the substrate.

In certain embodiments, in the ionic liquid catalyst, a grafted quantity of the ionic liquids grafted onto per gram of the substrate is between $10^4$ and $10^{18}$.

In certain embodiments, the substrate of the ionic liquid catalyst is made of carbon, silicon, iron, nickel, and/or cobalt, and an average particle size of the substrate is between 2 micrometers and 800 micrometers.

In certain embodiments, in the ionic liquid catalyst, the ionic liquids are at least one material selected from a group consisting of 1-butyl-3-methylimidazolium hexafluorophosphate (BMI-PF6), 1-butyl-3-methylimidazolium tetrachlorozincate ($BMI_2ZnCl_4$), 1-butyl-3-methylimidazolium tetrachloroironate ($BMI_2FeCl_4$), 1-butyl-3-methylimidazolium tetrachloroironate ($BMI_2CoCl_4$), and 1-butyl-3-methylimidazolium tetrachlorocobaltate (BMI-BF4).

In certain embodiments, in the ionic liquid catalyst, a bridging agent for grafting the ionic liquids onto the substrate is a silane coupling agent. A preparation method is to acidly de-compose the silane coupling agent; carry out a grafting reaction with the substrate to connect the silane coupling agent onto the substrate; and then graft the ionic liquids onto the silane coupling agent under a neutral environment to form the ionic liquid catalyst in a solid state.

In certain embodiments, in the separation operation, the ionic liquid catalyst has a higher specific gravity relative to the de-polymerization product, so that the ionic liquid catalyst is capable of being separated from the de-polymerization product through sedimentation. A catalyst recovery rate of the ionic liquid catalyst is not less than 95%.

In certain embodiments, after the separation operation, the method for recycling the polyester fabrics with the use of the ionic liquid catalyst further includes implementing a purification operation to obtain purified bis-2-hydroxyethyl terephthalate from the de-polymerization product; and implementing a pelletizing operation to re-polymerize the purified bis-2-hydroxyethyl terephthalate, and then to form recycled polyester pellets (r-PET). The recycled polyester pellets (r-PET) have an "L" value of not less than 60, an "a" value between 2 and 2, and a "b" value between −6 and 6, and the recycled polyester pellets (r-PET) have a recovery rate of not less than 90%.

In certain embodiments, the purification operation includes an adsorption process. The adsorption process includes dissolving the bis-2-hydroxyethyl terephthalate into water to form an aqueous phase liquid; and adding an activated carbon material and/or an ion exchange resin into the aqueous phase liquid, so that the activated carbon material and/or the ion exchange resin absorb impurities originally present in the recycled polyester fabric.

In certain embodiments, the aqueous phase liquid is heated to a liquid temperature between 70° C. and 150° C. to increase solubility of the bis hydroxyethyl terephthalate in water and enable the activated carbon material and/or the ion exchange resin to adsorb the impurities under the liquid temperature.

In certain embodiments, after the adsorption process, the purification operation further includes a crystallization process. The crystallization process includes cooling the aqueous phase liquid from the liquid temperature between 70° C. and 150° C. to a crystallization temperature between 5° C. and 25° C., so that the bis-2-hydroxyethyl terephthalate is crystallized out from the aqueous phase liquid, and the purified bis-2-hydroxyethyl terephthalate is obtained.

Therefore, in the method for recycling the polyester fabrics with use of the ionic liquid catalyst provided by the present disclosure, by virtue of "providing a recycled polyester fabric," "using a chemical de-polymerization liquid to chemically de-polymerize the recycled polyester fabric and form a de-polymerization product that mainly includes bis-2-hydroxyethyl terephthalate (BHET), in which the chemical de-polymerization liquid is used to chemically de-polymerize the recycled polyester fabric in an environment where a de-polymerization catalyst exists, and the de-polymerization catalyst is the ionic liquid catalyst in a solid state," and "implementing a separation operation, which includes separating the ionic liquid catalyst from the de-polymerization product by one or both of a centrifugal method and a filtering method, so as to collect the ionic liquid catalyst," a recycling quality of recycled polyester pellets (r-PET) can be effectively improved.

Furthermore, the method for recycling the polyester fabrics with use of the ionic liquid catalyst provided by the present disclosure has the advantages of high de-polymerization efficiency, easy to mass produce, and low costs.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for recycling polyester fabrics with use of an ionic liquid catalyst according to an embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Method for Recycling Polyester Fabrics Using Ionic Liquid Catalyst]

In the related art, de-polymerization methods of polyester fabrics mainly use organic metals or other organic substances as catalysts, and de-polymerization products formed by the de-polymerization methods mainly include bis-2-hydroxylethyl terephthalate (BHET). Then, an activated carbon material or an ion exchange resin is used to adsorb dyes and other impurities in the de-polymerized products, or the BHET can be distilled out by distillation.

However, the above-mentioned process of using the catalysts to catalyze a de-polymerization reaction for forming the BHET has disadvantages such as many side reactions and difficulty in recovering the catalyst. Therefore, producing recycled polyester pellets (r-PET) with use of the BHET formed by the above-mentioned methods have disadvantages that include poor quality and high recycling costs.

To solve the above-referenced technical inadequacies, referring to FIG. 1, an embodiment of the present disclosure provides a method for recycling polyester fabrics with use of an ionic liquid catalyst, which can improve a recycling quality of the recycled polyester pellets (r-PET) and has an advantage of low recycling costs. The method for recycling the polyester fabrics with the use of the ionic liquid catalyst includes step S110, step S120, step S130, step S140, and step S150. It should be noted that the sequence of the steps and the actual ways of operation described in the present embodiment can be adjusted according to requirements, and are not limited to those described in the present embodiment.

The step S110 includes implementing a preparation operation. The preparation operation includes providing a recycled polyester fabric, in which impurities are attached to the recycled polyester fabric. The impurities can be, for example, dyes and/or water repellents, but the present disclosure is not limited thereto.

The recycled polyester fabric can be, for example, colored by dyes. Furthermore, the recycled polyester fabric can be, for example, treated with a water-repellent agent to have a water repellent function. The dyes can be, for example, at least one of natural dyes and synthetic dyes. Alternatively, the dyes can be, for example, at least one of physical dyes and chemical dyes. The water repellent can be, for example, a water repellent containing silicon (Si), a water repellent containing fluorine (F), a water repellent containing fluorine and silicon, or a water repellent of water-based polyurethane (PU), but the present disclosure is not limited thereto.

In one embodiment of the present disclosure, the recycled polyester fabric has an "L" value greater than zero and not greater than 30 after dyeing. That is, the recycled polyester fabric has a darker color, but the present disclosure is not limited thereto. It should be noted that the above-mentioned "L" value is a parameter value representing brightness (or whiteness of a color) in Lab color space.

In one embodiment of the present disclosure, the recycled polyester fabric can also be an undyed polyester fabric. In other words, the recycled polyester fabric can, for example, have an original color of the polyester fabric without attachment of any dye.

The step S120 includes implementing a de-polymerization operation. The de-polymerization operation includes using a chemical de-polymerization liquid to chemically de-polymerize the recycled polyester fabric to form a de-polymerization product. The de-polymerization product mainly includes bis-2-hydroxylethyl terephthalate (BHET). Furthermore, the de-polymerization product further includes oligomers, the chemical de-polymerization liquid, and the impurities.

More specifically, the chemical de-polymerization liquid can be, for example, ethylene glycol (EG). The method of chemically de-polymerizing the recycled polyester fabric can be, for example, a glycol de-polymerization method (also called a glycol alcoholysis method). Accordingly, the recycled polyester fabric can be de-polymerized into a de-polymerized product mainly including the bis-2-hydroxylethyl terephthalate (BHET). Furthermore, the de-polymerization product also includes the oligomers formed by the de-polymerization reaction of the polyester fabrics, the above-mentioned chemical de-polymerization liquid (i.e., ethylene glycol) used in the de-polymerization reaction, and the impurities originally present in recycled polyester fabrics.

It is worth mentioning that the bis-2-hydroxylethyl terephthalate (BHET) is an intermediate of pure terephthalic acid (PTA) and ethylene glycol (EG). In addition, the bis-2-hydroxylethyl terephthalate (BHET) can also be used as a raw material for synthetic polyester (PET), and can also form polyester copolymers with other monomers.

Furthermore, in one embodiment of the present disclosure, the chemical de-polymerization liquid chemically de-polymerizes the recycled polyester fabric in the presence of a de-polymerization catalyst. The de-polymerization catalyst can be used to assist in reducing activation energy of the chemical de-polymerization liquid to chemically de-polymerize the polyester fabric. From another perspective, the de-polymerization catalyst can assist in increasing a reaction rate of the chemical de-polymerization liquid to chemically de-polymerize the recycled polyester fabric.

Furthermore, to enable the de-polymerization catalyst to be more easily recovered after use, the de-polymerization catalyst of the present embodiment is an ionic liquid catalyst. A substrate of the ionic liquid catalyst is made of carbon, silicon, iron, nickel, and/or cobalt. An average particle size of the substrate is between 2 micrometers and 800 micrometers. Furthermore, the ionic liquid catalyst is dispersed in the chemical de-polymerization liquid in a micron-level particle size, thereby effectively catalyzing the de-polymerization reaction of the recycled polyester fabric.

In one embodiment of the present disclosure, the chemical de-polymerization liquid is heated to a de-polymerization temperature to chemically de-polymerize the recycled polyester fabric. The de-polymerization temperature is preferably between 180° C. and 260° C., and is more preferably between 210° C. and 240° C., but the present disclosure is not limited thereto. Under the above-mentioned de-polymerization temperature, an efficiency of the chemical de-polymerization liquid for chemical de-polymerization of the recycled polyester fabric can be more effectively improved, and the ionic liquid catalyst can exert a greater catalytic effect.

In one embodiment of the present disclosure, the ionic liquid catalyst includes a substrate and ionic liquids grafted onto the substrate. A preparation step of the ionic liquid catalyst includes acidifying a surface of the substrate made of carbon, silicon, iron, nickel, and/or cobalt, so that OH functional groups are formed on the surface of the substrate. Then, silane compounds are synthesized with the OH functional groups, and the ionic liquids are synthesized with the silane compounds. The substrate is used for solid-liquid separation after the ionic liquid catalyst is used, so that the ionic liquid catalyst can be recovered. Furthermore, the ionic liquids are used to catalyze a reaction rate of the chemical de-polymerization liquid to chemically de-polymerize the recycled polyester fabric in the de-polymerization operation. It should be noted that the aforementioned substrate includes non-magnetic materials (such as carbon and/or silicon), and/or magnetic materials (such as iron, nickel, and/or cobalt).

In one embodiment of the present disclosure, the substrate is a granular material with a micron size. An average particle size range of the substrate is preferably between 2 micrometers and 800 micrometers, and is more preferably between 5 micrometers and 200 micrometers, but the present disclosure is not limited thereto.

In one embodiment of the present disclosure, a grafted quantity of the ionic liquids in the ionic liquid catalyst grafted onto per gram of the substrate is preferably between $10^4$ and $10^{18}$, and is more preferably between $10^5$ and $10^{15}$, but the present disclosure is not limited thereto.

In one embodiment of the present disclosure, a weight ratio of the ionic liquid catalyst to the recycled polyester fabric added in the chemical de-polymerization liquid is preferably in a range from 1:100 to 1:1000. That is, in the de-polymerization operation, a weight of the recycled polyester fabric added in the chemical de-polymerization liquid is 100 to 1000 times a weight of the ionic liquid catalyst, but the present disclosure is not limited thereto.

In one embodiment of the present disclosure, the ionic liquids in the ionic liquid catalyst are at least one material selected from a group consisting of 1-butyl-3-methylimidazolium hexafluorophosphate (BMI-PF6), 1-butyl-3-methylimidazolium tetrachlorozincate ($BMI_2ZnCl_4$), 1-butyl-3-methylimidazolium tetrachloroironate ($BMI_2FeCl_4$), 1-butyl-3-methylimidazolium tetrachloroironate ($BMI_2CoCl_4$), and 1-butyl-3-methylimidazolium tetrachlorocobaltate ($BMI-BF_4$), but the present disclosure is not limited thereto. The above-mentioned material types of the ionic liquids have an improved effect on catalyzing the recycled polyester fabric to carry out the chemical de-polymerization.

In one embodiment of the present disclosure, the substrate of the ionic liquid catalyst is at least one material selected from a group consisting of iron micro-particles, nickel micro-particles, carbon micro-particles, silicon micro-particles, and cobalt micro-particles.

The step S130 includes implementing a separation operation, which includes separating the ionic liquid catalyst from the de-polymerization product by a centrifugal method and/or a filtering method, so as to collect and recycle the ionic liquid catalyst for use. In the separation operation, compared to the de-polymerization product, the ionic liquid catalyst has a higher specific gravity, so that the ionic liquid catalyst is capable of being separated from the de-polymerization product through sedimentation and filtration. In the present embodiment, a catalyst recovery rate of the ionic liquid catalyst is not less than 95%.

Alternatively, the step S130 includes implementing a centrifugal sedimentation and filtration operation. A centrifugal process includes separating the de-polymerization liquid and the catalyst with a cyclone separator, and then separating the catalyst from the de-polymerization liquid with a filtering device, so as to collect the ionic liquid catalyst.

More specifically, in the centrifugal sedimentation and filtration operation, most of the ionic liquid catalyst can be separated from the de-polymerization product by differences in specific gravity. At this stage, the catalyst recovery rate of the ionic liquid catalyst is preferably not less than 70%. After that, the catalyst remaining in the de-polymerization liquid is separated through the filtering device. At this stage, the catalyst recovery rate of the ionic liquid catalyst is preferably not less than 95%, and is more preferably not less than 96%.

In one embodiment of the present disclosure, the de-polymerization product and the ionic liquid catalyst are separated from each other by sedimentation through natural gravity, centrifugal gravity, or the like. A filtrate of the de-polymerization product is further filtered by pressure filtration, centrifugal filtration, or the like, so that the ionic liquid catalyst can be collected. However, the present disclosure is not limited thereto.

According to the above configuration, the ionic liquid catalyst is used in the embodiment of the present disclosure to catalyze the de-polymerization reaction for forming the bis-2-hydroxylethyl terephthalate (BHET). The above process has advantages of few side reactions, high conversion rate, high selectivity, and having a recoverable catalyst. Therefore, the regenerated polyester pellets (r-PET) subsequently formed in the embodiment of the present disclosure can have a higher recycling quality and lower recycling costs.

The step S140 includes implementing a purification operation to obtain purified bis-2-hydroxylethyl terephthalate (purified BHET) from the de-polymerization product.

In one embodiment of the present disclosure, the purification operation sequentially includes an adsorption process and a crystallization process.

Specifically, the adsorption process includes dissolving the bis-2-hydroxylethyl terephthalate into water to form an aqueous phase liquid; and adding an activated carbon material and/or an ion exchange resin into the aqueous phase liquid, so that the activated carbon material and/or the ion exchange resin absorb the impurities (i.e., dyes) originally present in the recycled polyester fabric.

The aqueous phase liquid is heated to a liquid temperature between 70° C. and 150° C. to increase solubility of the bis-2-hydroxylethyl terephthalate in water and enable the activated carbon material and/or the ion exchange resin to adsorb the impurities under the liquid temperature. However, the present disclosure is not limited thereto.

Specifically, the crystallization process includes cooling the aqueous phase liquid from the liquid temperature between 70° C. and 150° C. to a crystallization temperature between 5° C. and 25° C., so that the bis-2-hydroxylethyl terephthalate is crystallized out from the aqueous phase liquid, and the purified bis-2-hydroxylethyl terephthalate is obtained.

The step S150 includes implementing a pelletizing operation to re-polymerize the purified bis-2-hydroxylethyl terephthalate, and then to form the recycled polyester pellets (r-PET). For example, through a single-screw pelletizer or a twin-screw pelletizer, the recycled polyester pellets can be formed by pelletizing the purified bis-2-hydroxylethyl terephthalate that has been polymerized.

In one embodiment of the present disclosure, the recycled polyester pellets (r-PET) formed by the pelletizing operation have an "L" value of not less than 60, an "a" value between –2 and 2, and a "b" value between –6 and 6, and the recycled polyester pellets (r-PET) have a recovery rate of not less than 90%.

[Experimental Data and Test Results]

To verify that the method for recycling the polyester fabrics with the use of the ionic liquid catalyst provided in the embodiment of the present disclosure has a good recovery effect and an improved yield, the following descriptions will be made with reference to Exemplary Examples 1 to 5 and Comparative Examples 1 to 5.

Exemplary Example 1

A solid ionic liquid catalyst, which is synthesized by activated carbon (having an average particle size of 61.3 um and a particle size of between 5 um and 284 um), chloropropyl-trimethoxy-silica and 1-butyl-3-methy-limidazole hexa-fluoro-phosphate (BMI-PF6), is used as a de-polymerization catalyst (SDX1 for short).

A preparation method of Exemplary Example 1 includes taking and putting 1 kg of PET fabric, 6 kg of ethylene glycol, and 20 g of the ionic liquid catalyst (SDX1) into a 10 liter three-necked glass bottle to form a reaction mixture. The reaction mixture is heated to 190° C., stirred and reacted for 3 hours to de-polymerize the PET fabric. A reaction liquid produced by de-polymerization of the PET fabric is cooled to 120° C. and centrifuged at 300 rpm for 1 minute. An upper reaction filtrate produced by centrifugation is taken out for being separated from the catalyst. The upper reaction filtrate is filtered with a 1 um filter cloth, so as to separate the remaining catalyst from the reaction liquid. The catalysts separated in two separation stages (centrifugation and filtration) are recycled for use, and a catalyst recovery rate is 96.7%.

Under an environment where an absolute pressure is 3 torr, the reaction liquid is heated from 120° C. to 170° C. to distill out an excess of EG and other substances, so that a residual EG content of the reaction liquid is less than 5%.

After the reaction liquid is cooled to 90° C., 7 kg of water is added into the reaction liquid, and a temperature of the reaction liquid is kept at 90° C. to dissolve BHET in the water. Then, 30 g of activated carbon is added into the reaction liquid, the temperature of the reaction liquid is kept at 90° C., and the reaction liquid is stirred for 1 hour, so that the activated carbon can adsorb dyes and other impurities. Then, the activated carbon is removed by filtration.

An aqueous solution including BHET at a temperature of 90° C. is cooled to 50° C. with cooling water, so as to crystallize the BHET. A cooling rate is 6° C./min, and a solid BHET is removed by filtration. A stock solution will undergo a second stage of cooling and crystallization. The aqueous solution including the BHET at the temperature of 50° C. is cooled to 5° C. with chilled water, so as to crystallize the BHET. The cooling rate is 0.2° C./min, and a solid BHET is removed by filtration.

After mixing and drying, the BHET obtained in the first stage and the BHET obtained in the second stage are polymerized into r-PET at 270° C. and 0.5 torr. The quality of the r-PET is L=61%, a=0.8, b=3.5, and the recovery rate is 93.0%. The catalyst recovery rate is 96.7%.

Exemplary Example 2

Exemplary Example 2 is substantially the same as Exemplary Example 1, except that the de-polymerization catalyst used in Exemplary Example 2 is different from that of Exemplary Example 1. Exemplary Example 2 uses a solid ionic liquid catalyst synthesized by silicon (having an average particle size of 55.4 um and a particle size of between 6 um and 275 um), chloro-propyl-trimethoxy-silica, and 1-butyl-3-methyl-imidazole hexa-fluoro-phosphate as the de-polymerization catalyst (SDX2). Other conditions of Exemplary Example 2 are the same as those of Exemplary Example 1.

The r-PET quality of Exemplary Example 2 is L=62%, a=0.9, b=4.6, and the recovery rate is 95.4%. The catalyst recovery rate is 98.4%.

Exemplary Example 3

Exemplary Example 3 is substantially the same as Exemplary Example 1, except that the de-polymerization catalyst used in Exemplary Example 3 is different from that of Exemplary Example 1. Exemplary Example 3 uses a solid ionic liquid catalyst synthesized by metallic nickel (having an average particle size of 64.3 um and a particle size of between 4 and 223 um), chloro-propyl-trimethoxy-silica, and 1-butyl-3-methyl-imidazole hexa-fluoro-phosphate, as the de-polymerization catalyst (SDX3). Other conditions of Exemplary Example 3 are the same as those of Exemplary Example 1.

The r-PET quality of Exemplary Example 3 is L=63%, a=0.6, b=4.8, and the recovery rate is 96.4%. The catalyst recovery rate is 99.2%.

Exemplary Example 4

Exemplary Example 4 is substantially the same as Exemplary Example 1. The difference is that Exemplary Example 4 uses the catalyst recovered in Exemplary Example 1 (19.34 g) that is mixed with the SDX1 catalyst (0.66 g) as the de-polymerization catalyst. Other conditions of Exemplary Example 4 are the same as those of Exemplary Example 1.

The r-PET quality of Exemplary Example 4 is L=63%, a=0.5, b=4.9, and the recovery rate is 96.1%. The catalyst recovery rate is 96.5%.

Exemplary Example 5

Exemplary Example 5 is substantially the same as Exemplary Example 4. The difference is that Exemplary Example 5 uses the catalyst recovered in Exemplary Example 4 (19.30 g) that is mixed with the SDX1 catalyst (0.70 g) as the de-polymerization catalyst. Other conditions of Exemplary Example 5 are the same as those of Exemplary Example 4.

The r-PET quality of Exemplary Example 5 is L=62%, a=0.3, b=4.7, and the recovery rate is 96.3%. The catalyst recovery rate is 96.7%.

Comparative Example 1

A preparation method of Comparative Example 1 includes taking and putting 1 kg of PET fabric, 6 kg of ethylene glycol and 20 g of zinc acetate catalyst into a 10 liter three-necked glass bottle to form a reaction liquid. The reaction liquid is heated to 190° C., stirred for 6 hours, and then heated to a boiling temperature (195-210° C.) to distill off an excess of EG, so that a residual EG content of the reaction liquid is less than 5%.

After the reaction liquid is cooled to 90° C., 7 kg of water is added into the reaction liquid, and the temperature of the reaction liquid is maintained at 90° C. to dissolve BHET into the water. Then, 30 g of activated carbon is added into the reaction liquid, and the temperature of the reaction liquid is maintained at 90° C. and stirred for 1 hour, so that the activated carbon could adsorb impurities such as dyes. Then, the activated carbon is filtered and removed.

An aqueous solution including BHET at a temperature of 90° C. is cooled to 50° C. with cooling water to crystallize BHET. A cooling rate is 6° C./min. A solid BHET is removed by filtration. A liquid mother liquor will undergo a second stage of cooling and crystallization.

The aqueous solution including the BHET at the temperature of 50° C. is cooled to 5° C. with chilled water, so as to crystallize the BHET. A cooling rate is 0.2° C./min, and a solid BHET is removed by filtration.

After mixing and drying the BHET obtained in the first stage and the BHET obtained in the second stage, the BHET is polymerized into r-PET at 270° C. and 0.5 torr.

The quality of the r-PET is L=55%, a=1.6, b=5.1, and the recovery rate is 81.3%. The catalyst recovery rate is 0% given that the catalyst is not easy to recover when dissolved in water.

Comparative Example 2

Comparative Example 2 is substantially the same as Comparative Example 1. Comparative Example 2 only uses sodium acetate to replace zinc acetate as a catalyst. Other process conditions of Comparative Example 2 are the same as those of Comparative Example 1. The r-PET quality of Comparative Example 2 is L=57%, a=1.4, b=6.2, and the yield is 77.9%. The catalyst recovery rate is 0%. In addition, the catalyst of Comparative Example 2 is difficult to be recovered when dissolved in water.

Comparative Example 3

Comparative Example 3 is substantially the same as Comparative Example 1, except that the stirring is changed from 6 hours to 4 hours in Comparative Example 3. Other process conditions of Comparative Example 3 are the same as those of Comparative Example 1. The r-PET quality of Comparative Example 3 is L=56%, a=1.9, b=7.1, and the recovery rate is 58.3%. The catalyst recovery rate is 0%. In addition, the catalyst of Comparative Example 3 is difficult to be recovered, and the cost of the ionic liquid catalyst is high.

Comparative Example 4

Comparative Example 4 is substantially the same as Comparative Example 1. Comparative Example 4 only uses 1-butyl-3-methylimidazole hexafluorophosphate (BMI-PF6) to replace zinc acetate as a catalyst. Other process conditions of Comparative Example 4 are the same as those of Comparative Example 1. The r-PET quality of Comparative Example 4 is L=61%, a=1.4, b=6.2, and the yield is 87.8%. The catalyst recovery rate is 0%. In addition, the catalyst of Comparative Example 4 is not easy to recover when dissolved in water.

Comparative Example 5

Comparative Example 5 is substantially the same as Comparative Example 1. Comparative Example 5 only uses 1-butyl-3-methylimidazole tetra-chloro-zincate (abbreviated as $BMI_2ZnCl_4$) to replace zinc acetate as a catalyst. Other process conditions of Comparative Example 5 are the same as those of Comparative Example 1. The r-PET quality of Comparative Example 5 is L=60%, a=1.1, b=6.7, and the yield is 89.7%. The catalyst recovery rate is 0%. In addition, the catalyst is not easy to recover when dissolved in water, and the cost of the ionic liquid catalyst is high.

Beneficial Effects of the Embodiments

In conclusion, in the method for recycling the polyester fabrics with the use of the ionic liquid catalyst provided by the present disclosure, by virtue of "providing a recycled polyester fabric; using a chemical de-polymerization liquid to chemically de-polymerize the recycled polyester fabric to form a de-polymerization product, which mainly includes bis-2-hydroxylethyl terephthalate (BHET); in which the chemical de-polymerization liquid is to chemically de-polymerize the recycled polyester fabric in an environment where a de-polymerization catalyst exists, and the de-polymerization catalyst is an ionic liquid catalyst in a solid state," and "implementing a separation operation, which includes separating the ionic liquid catalyst from the de-polymerization product by a centrifugal method and/or a filtering method, so as to collect the ionic liquid catalyst", recycling quality of recycled polyester pellets (r-PET) can be effectively improved. Furthermore, the method for recycling the polyester fabrics with the use of the ionic liquid catalyst provided by the present disclosure has the advantages of high de-polymerization efficiency, easy to mass produce, and low cost.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for recycling polyester fabrics with use of an ionic liquid catalyst, comprising:
    implementing a preparation operation, which includes providing a recycled polyester fabric;
    implementing a de-polymerization operation, which includes using a chemical de-polymerization liquid to chemically de-polymerize the recycled polyester fabric and form a de-polymerization product, wherein the de-polymerization product includes bis-2-hydroxylethyl terephthalate (BHET); wherein the de-polymerization operation is to chemically de-polymerize the recycled polyester fabric in an environment where the ionic liquid catalyst is present; wherein the ionic liquid catalyst includes a substrate and ionic liquids grafted onto the substrate, the substrate is made of carbon, silicon, iron, nickel, and/or cobalt, and an average particle size of the substrate is between 2 micrometers and 800 micrometers; and
    implementing a separation operation, which includes separating the ionic liquid catalyst from the de-polymerization product by one or both of a centrifugal method and a filtering method, so as to collect and recycle the ionic liquid catalyst for use.

2. The method according to claim 1, wherein, in the de-polymerization operation, the chemical de-polymerization liquid is ethylene glycol (EG), and the chemical de-polymerization liquid is heated to a de-polymerization temperature between 180° C. and 260° C., so as to chemically de-polymerize the recycled polyester fabric.

3. The method according to claim 1, wherein, in the ionic liquid catalyst, the ionic liquids are at least one material selected from a group consisting of 1-butyl-3-methylimidazolium hexafluorophosphate (BMI-PF6), 1-butyl-3-methylimidazolium tetrachlorozincate ($BMI_2ZnCl_4$), 1-butyl-3-methylimidazolium tetrachloroironate ($BMI_2FeCl_4$), 1-butyl-3-methylimidazolium tetrachlorocobaltate ($BMI_2CoCl_4$), and 1-butyl-3-methylimidazolium tetrafluoroborate ($BMI-BF_4$).

4. The method according to claim 1, wherein, in the ionic liquid catalyst, a bridging agent for grafting the ionic liquids onto the substrate is a silane coupling agent; wherein a preparation method is to acidly de-compose the silane coupling agent before the silane coupling agent carries out a grafting reaction with the substrate, and to graft the ionic liquids onto the silane coupling agent in an alkaline environment, so as to form the ionic liquid catalyst.

5. The method according to claim 1, wherein, in the separation operation, the ionic liquid catalyst has a higher specific gravity relative to the de-polymerization product, so that the ionic liquid catalyst is capable of being separated from the de-polymerization product through sedimentation; wherein a catalyst recovery rate of the ionic liquid catalyst is not less than 95%.

6. The method according to claim 1, wherein, after the separation operation, the method further includes implementing a purification operation to obtain purified bis-2-hydroxyethyl terephthalate from the depolymerization product, wherein the purification operation includes an adsorption process; wherein the adsorption process includes: dissolving the bis-2-hydroxylethyl terephthalate into water to form an aqueous phase liquid, and adding one or both of an activated carbon material and an ion exchange resin into the aqueous phase liquid, so that one or both of the activated carbon material and the ion exchange resin absorb impurities originally present in the recycled polyester fabric.

7. The method according to claim 6, wherein the aqueous phase liquid is heated to a liquid temperature between 70° C. and 150° C., so as to increase solubility of the bis-2-hydroxylethyl terephthalate in the water and to enable one or both of the activated carbon material and the ion exchange resin to adsorb the impurities under the liquid temperature.

8. The method according to claim 7, wherein, after the adsorption process, the purification operation further includes a crystallization process; wherein the crystallization process includes: cooling the aqueous phase liquid from the liquid temperature between 70° C. and 150° C. to a crystallization temperature between 5° C. and 25° C., so that the bis-2-hydroxylethyl terephthalate is crystallized out from the aqueous phase liquid, and the purified bis-2-hydroxylethyl terephthalate is obtained.

* * * * *